United States Patent
Aruga

(10) Patent No.: US 11,927,246 B2
(45) Date of Patent: Mar. 12, 2024

(54) SHORTENING CLUTCH

(71) Applicant: KITO CORPORATION, Yamanashi (JP)

(72) Inventor: Masaki Aruga, Yamanashi (JP)

(73) Assignee: KITO CORPORATION, Yamanashi (JP)

( * ) Notice: Subject to any disclaimer, the term of this patent is extended or adjusted under 35 U.S.C. 154(b) by 630 days.

(21) Appl. No.: 15/734,778

(22) PCT Filed: Feb. 6, 2019

(86) PCT No.: PCT/JP2019/004250
§ 371 (c)(1),
(2) Date: Dec. 3, 2020

(87) PCT Pub. No.: WO2019/234971
PCT Pub. Date: Dec. 12, 2019

(65) Prior Publication Data
US 2021/0231195 A1 Jul. 29, 2021

(30) Foreign Application Priority Data
Jun. 4, 2018 (JP) .................................. 2018-107103

(51) Int. Cl.
*F16G 15/04* (2006.01)
*F16G 15/00* (2006.01)
*F16G 17/00* (2006.01)

(52) U.S. Cl.
CPC ............. *F16G 15/04* (2013.01); *F16G 17/00* (2013.01)

(58) Field of Classification Search
CPC ................................ F16G 15/00; F16G 15/04
See application file for complete search history.

(56) References Cited

U.S. PATENT DOCUMENTS

| | | | | |
|---|---|---|---|---|
| 2,978,766 A | * | 4/1961 | Arnett | B66C 1/36 24/599.7 |
| 4,151,708 A | * | 5/1979 | Smetz | F16G 17/00 24/116 R |
| 2010/0007159 A1 | | 1/2010 | Henrion | |

FOREIGN PATENT DOCUMENTS

| | | |
|---|---|---|
| CN | 101400921 A | 4/2009 |
| DE | 4115341 A1 | 11/1991 |

(Continued)

OTHER PUBLICATIONS

English translate (DE10222818B3), retrieved date Jul. 5, 2023.*

(Continued)

*Primary Examiner* — Matthew Katcoff
*Assistant Examiner* — Mohammed S. Alawadi
(74) *Attorney, Agent, or Firm* — CANTOR COLBURN LLP

(57) ABSTRACT

A main body provided with a pocket for accommodating a first chain link of another chain, and a lock lever which is capable of switching between a locked state and an unlocked state by pivoting, and which restricts disengagement of the first chain link from the pocket in the locked state, and allows the first chain link to disengage from the pocket in the unlocked state, which is resisted by an urging force of an urging member, wherein the lock lever is provided with a locking piece which projects from a pivot point toward the pocket side, and the locking piece projects toward a position in which movement of a second chain link in an escaping direction is restricted, a first operating piece extending to the side of the pivot point on which one chain is coupled, and a second operating piece extending to the opposite side.

8 Claims, 13 Drawing Sheets

(56) References Cited

FOREIGN PATENT DOCUMENTS

| | | | | |
|---|---|---|---|---|
| DE | 10222818 B3 * | 1/2004 | ............. | F16G 15/00 |
| DE | 10222818 B3 | 1/2004 | | |
| DE | 202004002161 U1 | 4/2004 | | |
| JP | S5322945 A | 3/1978 | | |
| JP | S53117160 A | 10/1978 | | |
| JP | H10219994 A | 8/1998 | | |

OTHER PUBLICATIONS

CNIPA First Office Action for corresponding CN Application No. 201980035512.2; dated Oct. 19, 2021.
International Search Report for International Application No. PCT/JP2019/004250; dated Apr. 23, 2019.

\* cited by examiner

SHORTENING CLUTCH

CROSS REFERENCE TO RELATED APPLICATIONS

This is the U.S. national stage of application No. PCT/JP2019/004250, filed on Feb. 6, 2019. Priority under 35 U.S.C. § 119(a) and 35 U.S.C. § 365(b) is claimed from Japanese Application No. 2018-107103, filed Jun. 4, 2018, the disclosure of which is also incorporated herein by reference.

TECHNICAL FIELD

The present invention relates to a shortening clutch for coupling chains.

BACKGROUND ART

A coupling tool called a shortening clutch is widely used for coupling chains, for instance, and the shortening clutch is used to adjust the length of a chain composed of the coupled chains (hereinafter, referred to as a coupled chain). Patent Literature 1 and Patent Literature 2 disclose such a shortening clutch.

In the configuration disclosed in PTL 1, an arm (19) which pivots about a pin (20) is provided and a locking tongue (16) at the tip of the arm (19) hinders the release of a chain link accommodated in a pocket. Further, for removing the chain link from the pocket, an end surface (23) of the arm (19) is moved up with a finger or the like so that the arm (19) pivots against an urging force of a spring (21), thereby hindering the locking tongue (16) from interfering with the chain link.

Further, in the configuration disclosed in PTL 2, a locking member (33) pivots about a pin (34), and a projection (45) of the locking member (33) hinders the disengagement of a chain link accommodated in a pocket. Further, for removing the chain link from the pocket, a free end (42) of the locking member (33) is gripped and the locking member (33) is caused to pivot against an urging force of a spring (37), thereby hindering the projection (45) from interfering with the chain link.

CITATION LIST

Patent Literature (PTL 1) U.S. Pat. No. 4,151,708
(PTL 2) DE202004002161U1

SUMMARY OF INVENTION

Technical Problem

In the configuration disclosed in PTL 1, for removing the chain link from the pocket, while a main body is held with one hand, the finger or the like is pressed against the end surface (23) and in this state, the end surface (23) is caused to pivot upward with the finger or the like so that the arm (19) pivots in an unlocking direction against the urging force of the spring (21). At this time, the other hand grips the chain accommodated in the pocket and pulls the chain to remove the chain link accommodated in the pocket. Accordingly, with one hand, it is necessary both to hold the main body and to unlock the arm (19) against the urging force of the spring (21). In this state, operability is very poor.

In particular, if a shortening clutch has a large capacity (usable maximum load), the above operation for unlocking is very difficult.

Further, in the configuration disclosed in PTL 2, for removing the chain link from the pocket, the free end (42) side of the locking member (33) is pinched or gripped with fingers or the like while the main body is held with one hand, and the locking member (33) is caused to pivot in the unlocking direction against the urging force of the spring (37). At this time, as in the configuration disclosed in PTL 1, the other hand grips the chain accommodated in the pocket and pulls the chain to remove the chain link accommodated in the pocket. Accordingly, with one hand, it is necessary both to hold the main body and to unlock the locking member (33) against the urging force of the spring (37). In this state, operability is very poor.

The present invention was made based on the above-described circumstances and has an object to provide a shortening clutch with which it is possible to improve operability when removing a chain link.

Solution to Problem

To solve the aforesaid problem, according to a first aspect of the present invention, there is provided a shortening clutch for connecting one chain and another chain, the shortening clutch including: a main body coupled to the one chain and including a pocket for accommodating a first chain link of the other chain; and a lock lever which is pivotably attached to the main body through a pivot point having an urging member, is capable of switching between a locked state and an unlocked state by pivoting, and in the locked state, restricts disengagement of the first chain link accommodated in the pocket, from the pocket, while in the unlocked state in which the lock lever resists an urging force of an urging member, allowing the first chain link to disengage from the pocket, wherein the lock lever includes: a locking piece which, in the locked state, projects from the pivot point to the pocket side, in which the locking piece projects toward a position where the locking piece restricts movement of a second chain link in an escaping direction of the pocket, and the second chain link is adjacently coupled to the first chain link accommodated in the pocket; a first operating piece extending from the pivot point toward a side where the one chain is coupled; and a second operating piece extending from the pivot point toward a side opposite to the side where the one chain is coupled.

Further, in another mode of the present invention, in the above-described invention, preferably, the lock lever includes an exposed surface exposed outward from the main body, and the exposed surface is provided planarly along the first operating piece and the second operating piece.

Further, in another mode of the present invention, in the above-described invention, preferably, in a state in which the second chain link is fitted up to a deepest portion of the pocket, the second operating piece is pressed by the second chain link so that the locking piece is pivoted no to abut on the main body, and when the first chain link moves in the escaping direction from the deepest portion of the pocket, the urging member causes the lock lever to pivot to make the locking piece abut on the main body.

Further, in another mode of the present invention, in the above-described invention, preferably, the other chain has a third chain link different from the first chain link and coupled to the second chain link, the main body includes a bulge on a periphery of the pocket, the bulge comes into contact with the third chain link to inhibit the lock lever from pivoting in an unlocking direction due to movement of the second chain link toward the second operating piece, the main body includes a pair of leg portions facing each other and a transverse portion provided between the pair of leg portions, the locking piece includes: a pivot restricting surface which collides with the transverse portion; and a chain abutting end which collides with the second chain link when the second chain link moves in the escaping direction, and in the locked state in which the chain abutting end and the second chain link collide with each other at a first collision point, a virtual line connecting a rotation center of the lock lever and the first collision point makes an obtuse angle with a tangent of the second chain link at the first collision point.

Further, in another mode of the present invention, in the above-described invention, preferably, the lock lever includes a guiding slope which is inclined so as to more approach the exposed surface as the guiding slope goes more apart from the pivot point.

Further, in another mode of the present invention, in the above-described invention, preferably, the main body includes a pair of leg portions facing each other, and the lock lever is disposed in a lever arrangement space present between the pair of leg portions, the pair of leg portions each include a recess dented from a surface of the leg portion, and a holding concave portion which, in the locked state, communicates with the recesses present in the pair of the leg portions is provided between the second operating piece and the locking piece.

Further, in another mode of the present invention, in the above-described invention, preferably, the recesses include sloping surfaces which are inclined relative to the surfaces of the pair of leg portions, and a slope tilt angle of the sloping surfaces relative to the surfaces is larger than a maximum tilt angle that the lock lever has when inclined most in the unlocked state.

Further, to solve the aforesaid problem, according to a second aspect of the present invention, there is provided a shortening clutch for connecting one chain and another chain, the shortening clutch including: a main body coupled to the one chain and including a pocket for accommodating a first chain link of the other chain; a lock lever which is pivotably attached to the main body through a pivot point, is capable of switching between a locked state and an unlocked state by pivoting, and in the locked state, restricts disengagement of the first chain link accommodated in the pocket, from the pocket, while in the unlocked state, allowing the first chain link to disengage from the pocket; and a posture maintaining means which is attached to the main body and maintains a posture that the lock lever has in one of the locked state or the unlocked state, wherein the lock lever includes: a locking piece which, in the locked state, projects from the pivot point to the pocket side the, locking piece projects toward a position where the locking piece restricts movement of a second chain link in an escaping direction, the second chain link being adjacently coupled, on a side opposite to the escaping direction of the first chain link, to the first chain link accommodated in the pocket; a first position which is provided in the lock lever and maintains the locked state of the lock lever by being given a force from the posture maintaining means; and a second position which is provided in the lock lever, maintains the unlocked state of the lock lever by being given the force from the posture maintaining means, and is present at a position different from the first position.

Advantageous Effects of Invention

According to the present invention, it is possible to provide a shortening clutch with which it is possible to improve operability when removing a chain link.

DESCRIPTION OF EMBODIMENTS

Figure 1:
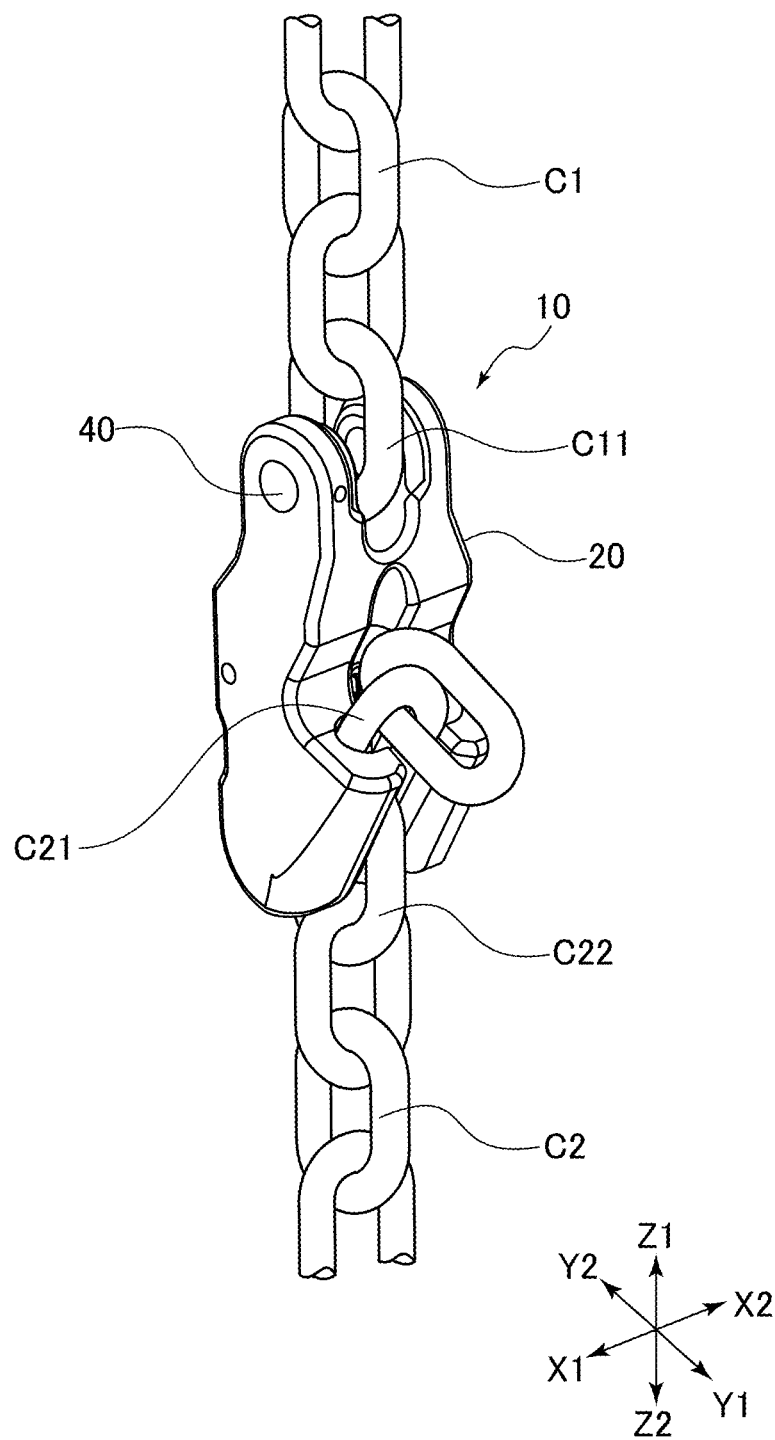
FIG. 1 is a perspective view illustrating a usage state of a shortening clutch of one embodiment of the present invention.

Hereinafter, a shortening clutch 10 according to one embodiment of the present invention will be described based on the drawings. Note that in the following description, an XYZ orthogonal coordinate system is used as necessary for description. An X-direction in the XYZ orthogonal coordinate system indicates a direction connecting one leg portion 27a and the other leg portion 27b, which will be described later, with an X1 side indicating a side where the leg portion 27a is located in FIG. 2 (right side) and with an X2 side indicating the opposite side where the other leg portion 27b is located (left side). Further, a Y-direction indicates a width direction of each of the leg portions 27a, 27b (direction orthogonal to the X-direction) in FIG. 2, with a Y1 side indicating a side where pockets 30 are located when seen from a lock lever 60 (right upward side; front side) and with a Y2 side indicating a side where the lock lever 60 is located when seen from the pockets 30 (left downward side; rear side) in FIG. 2.

Further, a Z-direction indicates a longitudinal direction connecting an arm portion 21a and the leg portion 27a (or an arm portion 21b and the leg portion 27b), with a Z1 side indicating a side where the arm portion 21a (or the arm portion 21b) is located (upper side) when seen from the leg portion 27a (or the leg portion 27b) and with a Z2 side indicating a side where the leg portion 27a (or the leg portion 27b) is located when seen from the arm portion 21a (or the arm portion 21b). Note that the Z-direction also corresponds to a vertical direction (up-down direction) in which the shortening clutch 10 hangs down, but this Z-direction also applies to a case where its direction changes from the vertical direction. In the following description, the up-down direction when the shortening clutch 10 is hanged down in the Z-direction may be used for description as necessary. In this case, the Z1 side corresponds to the upper side and the Z2 side corresponds to the lower side.

Regarding Configuration of Shortening Clutch 10

Figure 2:
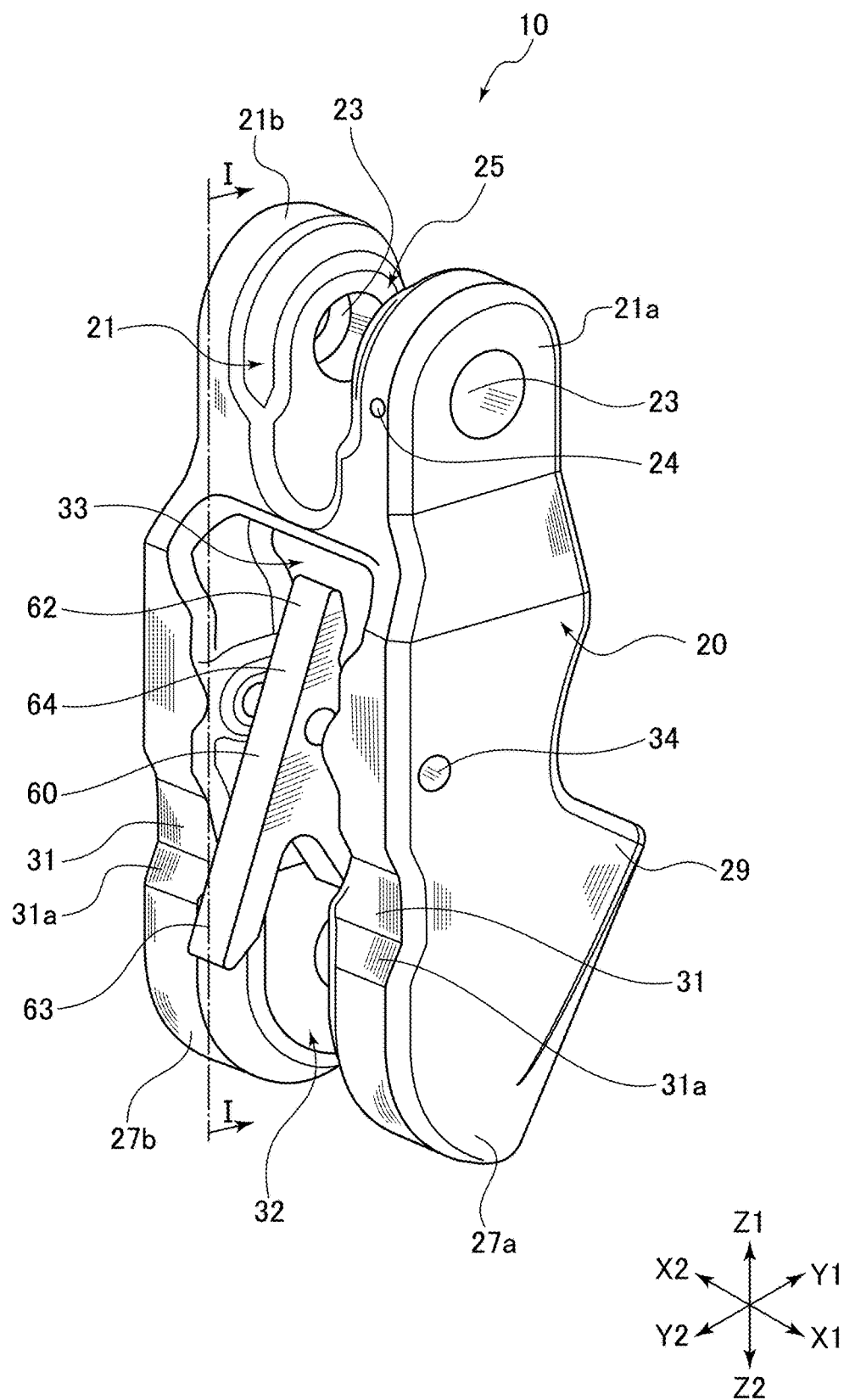
FIG. 2 is a perspective view illustrating the whole configuration of the shortening clutch according to the embodiment of the present invention.
Figure 3:
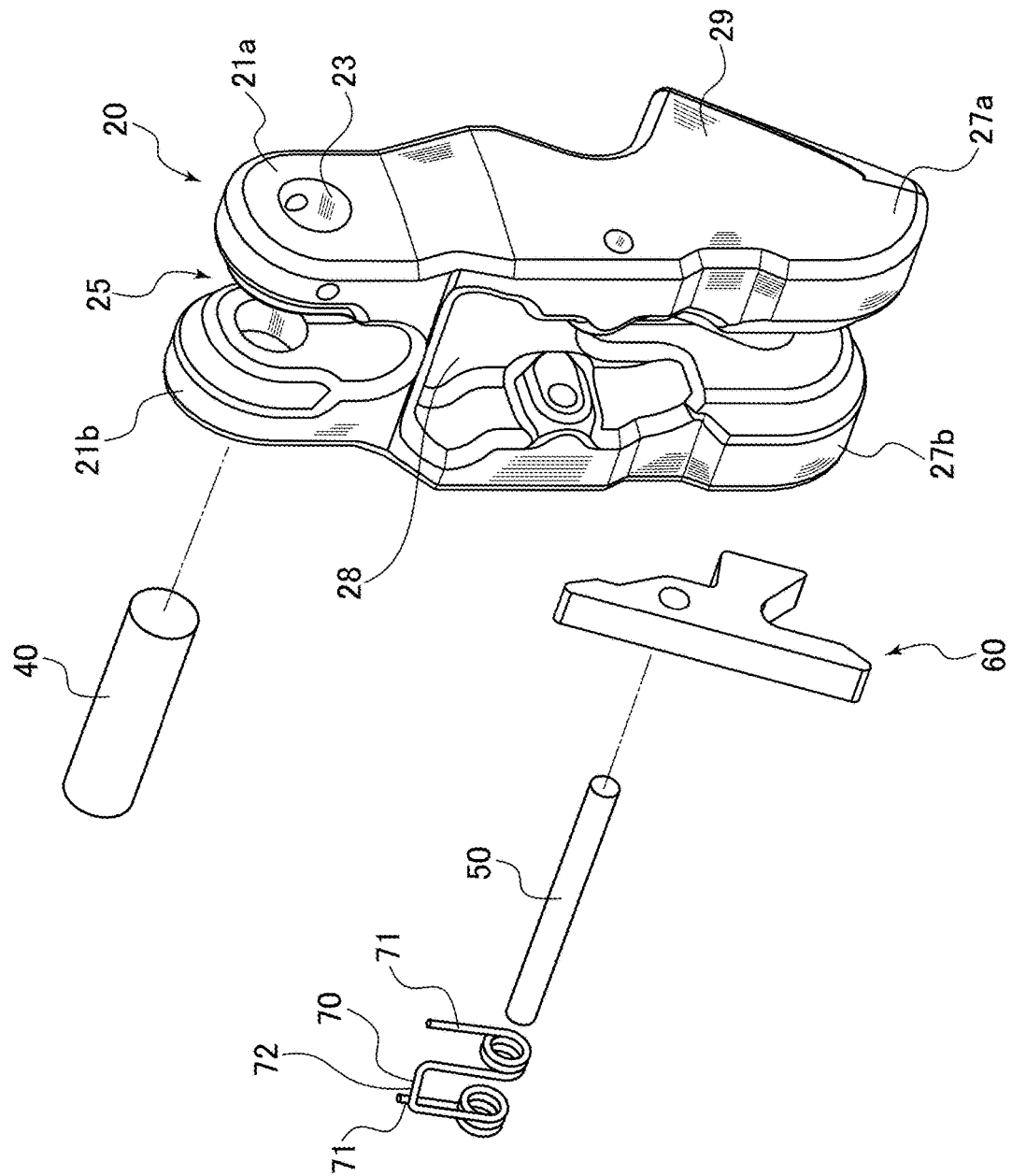
FIG. 3 is an exploded perspective view illustrating the configuration of the shortening clutch illustrated in FIG. 1.
Figure 4:
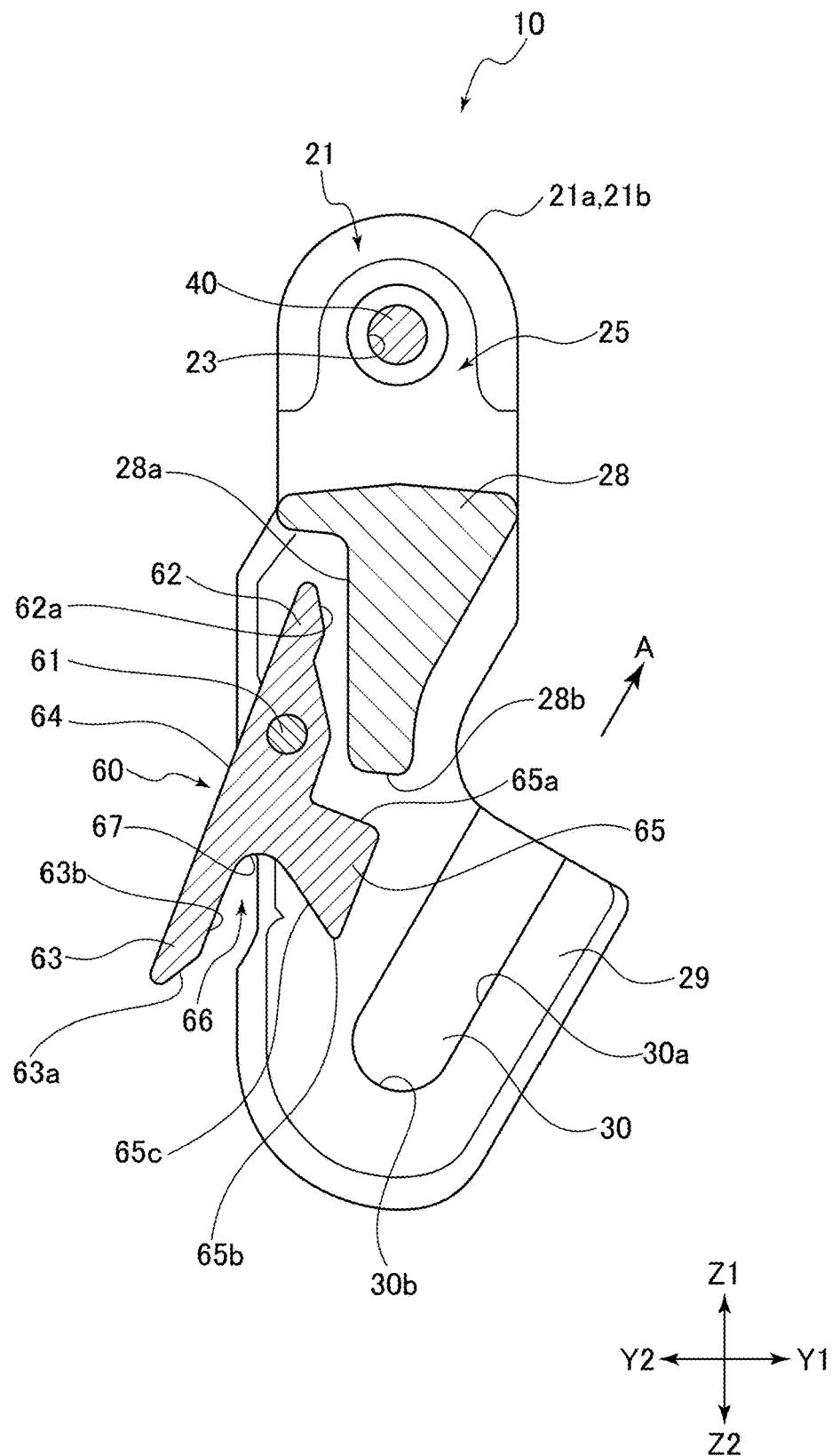
FIG. 4 is a sectional view illustrating the shortening clutch illustrated in FIG. 2, taken along the I-I line.
Figure 5:
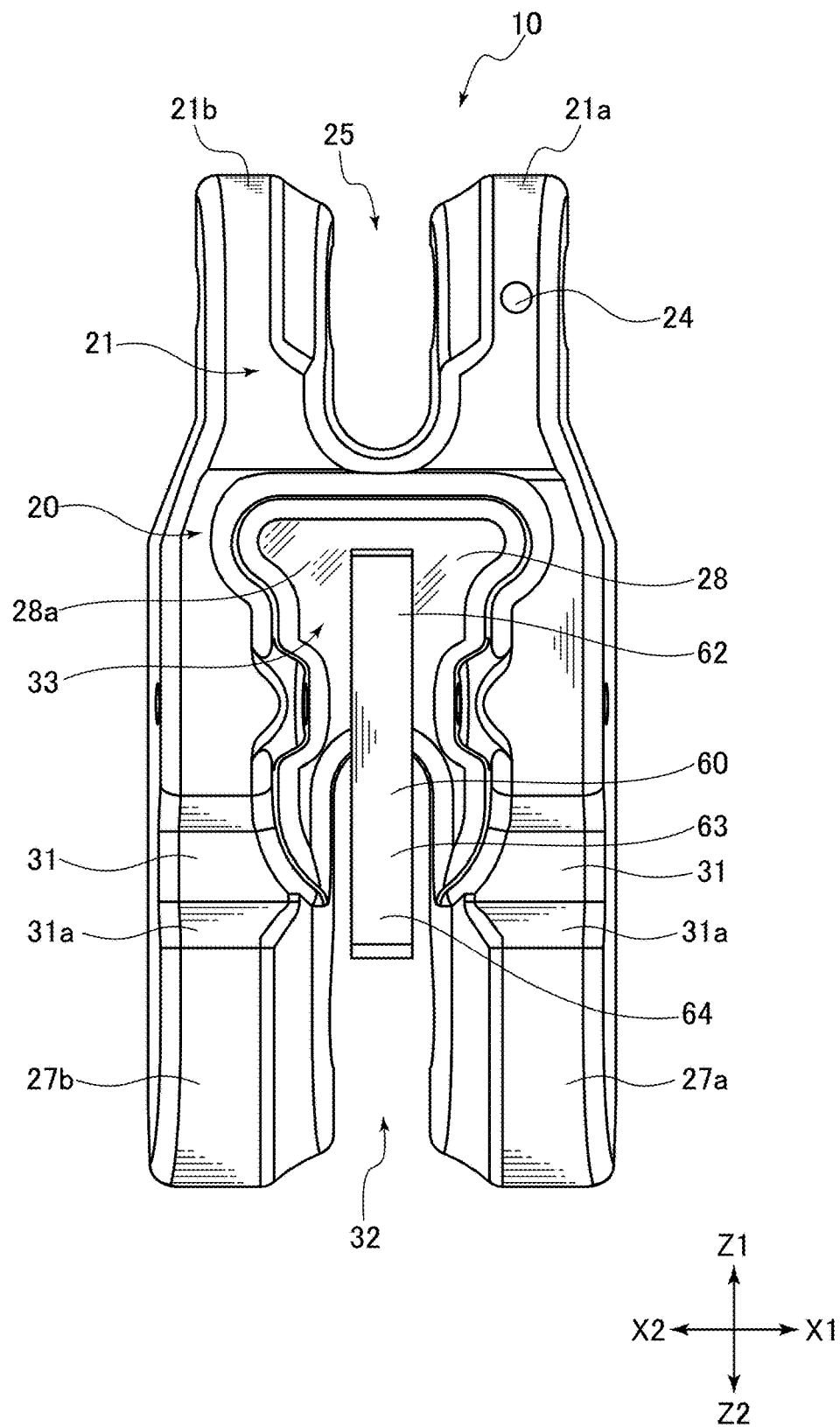
FIG. 5 is a view illustrating the shortening clutch illustrated in FIG. 2, seen from a rear side (Y2 side).

FIG. 1 is a perspective view illustrating a usage state of the shortening clutch 10 of one embodiment of the present invention. FIG. 2 is a perspective view illustrating the whole configuration of the shortening clutch 10 according to the one embodiment of the present invention. FIG. 3 is an exploded perspective view illustrating the configuration of the shortening clutch 10 illustrated in FIG. 1. FIG. 4 is a sectional view illustrating the shortening clutch 10 illustrated in FIG. 2, taken along the I-I line. FIG. 5 is a view illustrating the shortening clutch 10 illustrated in FIG. 2, seen from the rear side (Y2 side). Note that in FIG. 2, the illustration of a coupling pin 40, a pivot pin and an urging spring 70 which will be described later is omitted.

The shortening clutch 10 of this embodiment is a member for connecting one chain C1 and another chain C2. For connecting these, for example, an optional chain link out of many chain links present in the other chain C2 is selected. Then, the selected chain link (referred to as a chain link C21; corresponding to a first chain link) is accommodated in later-described pockets 30, and further, the later-described lock lever hinders the disengagement of a chain link (referred to as a chain link C22; corresponding to a second chain link) adjacent to a lower side (Z2 side) of the chain link C21 accommodated in the pockets 30. Hereinafter, details of the configuration of such a shortening clutch 10 will be described. Note that the chain link C22 is adjacent to the chain link C11 on a side opposite to an escaping direction in which it escapes from the pockets 30.

As illustrated in FIG. 2 to FIG. 4, the shortening clutch 10 of this embodiment has a main body 20, the coupling pin 40, the pivot pin 50, the lock lever 60, and the urging spring 70. The main body 20 is made of metal such as, for example, an iron-based material.

The main body 20 includes, in its upper side (Z1 side), the pair of arm portions 21a, 21b, and the pair of arm portions 21a, 21b each have a support hole 23 along a direction in which the arm portions 21a, 21b face each other (X-direction). The coupling pin 40 is inserted into the support holes 23 as will be described later. Further, in at least one of the pair of arm portion 21a, 21b, a pin hole 24 is provided, and a retainer pin (not illustrated) hindering the coupling pin 40 from coming off the support holes 23 is inserted into the pin hole 24.

Further, in a first facing space 25 between the pair of arm portions 21a, 21b, a chain link C11 of the chain C1 is located. The coupling pin 40 is inserted into a ring hole of the chain link C11, the coupling pin 40 is inserted into the support holes 23, and the retainer pin (not illustrated) is further inserted into the pin hole 24. Consequently, the shortening clutch 10 is coupled to the chain C1.

Note that the part composed of the pair of arm portions 21a, 21b and the first facing space 25 is a part where to connect the chain C1 as described above, and in the description below, this part will be called a chain connection portion 21.

The main body 20 further includes the pair of leg portions 27a, 27b. The leg portion 27a continues from the arm portion 21a and the other leg portion 27b continues from the other arm portion 21b. A transverse portion 28 is further provided at a position that is on a root side of the pair of arm portions 21a, 21b and is between the leg portion 27a and the other leg portion 27b, and the transverse portion 28 integrally couples the leg portion 27a (the arm portion 21a) and the other leg portion 27b (the other arm portion 21b).

Further, bulges 29 projecting toward the front side (Y1 side) are provided on the lower sides (Z2 sides) of the leg portions 27a, 27b respectively. Incidentally, as illustrated in FIG. 2 to FIG. 4, in this embodiment, the bulges 29 project in a substantially triangular shape from the leg portions 27a, 27b in a side view of the bulges 29. In each of the bulges 29, the pocket 30 is provided. The pockets 30 are parts dented in the X-direction from a later-described second facing space 32 side, and the chain link C21 is accommodated in the pockets 30. Note that, as illustrated in FIG. 4, the pockets 30 are inclined obliquely relative to the front-rear direction (Y-direction) so as to more approach the front side from the rear side (Y2 side) as they go toward the upper side (Z1 side) from the lower side (Z2 side).

Here, the leg portions 27a, 27b include recesses 31 dented toward the front side (Y1 side) from rear-side (Y2-side) planes (surfaces) of the leg portions 27a, 27b. The recesses 31 are located more on a lower side (Z2 side) than later-described insertion holes 34. Further, the recesses 31 are provided more on a lower side (Z2 side) than a later-described curved surface 67. In the recesses 31, a rod-shaped member 80 (refer to FIG. 9) is located, and the rod-shaped member 80 is located also in a later-described holding concave portion 66. This makes it possible to keep the unlocked state of the lock lever 60.

Note that in the recesses 31, sloping surfaces 31a are present. Details of the sloping surfaces 31a will be described later.

Further, at a position that is on the lower side (Z2 side) of the transverse portion 28 and is in the second facing space 32 across which the pair of leg portions 27a, 27b face each other, the chain link C22 of the other chain C2 is located. In the locked state of the lock lever 60, the chain link C22 interferes with a later-described locking piece 65 to be hindered from moving in the escaping direction indicated by the arrow A in FIG. 4. At this time, the chain link C22 is capable of pivoting on the chain link C21 in the second facing space 32. On the other hand, in the unlocked state of the lock lever 60, the chain link C22 does not interfere with the locking piece 65 and is capable of moving in the escaping direction indicated by the arrow A.

Further, the transverse portion 28 is provided so as to be dented toward a more front side (Y1 side) than the pair of leg portions 27a, 27b. In the description below, the aforesaid dented portion located between a rear-side (Y2-side) plane of the pair of leg portions 27a, 27b and a rear-side (Y2-side)

surface (rear surface 28a) of the transverse portion 28 will be referred to as a lever arrangement space 33. The lever arrangement space 33 is a part where an upper side (Z1 side) of the later-described lock lever 60 is located. Note that, in this embodiment, the rear surface 28a is provided planarly and this planar surface is parallel to an XZ plane.

Further, in the pair of leg portions 27a, 27b, insertion holes 34 extending along the direction in which they face each other (X-direction) are provided. The later-described pivot pin 50 is inserted into the insertion holes 34. Note that a not-illustrated retainer prevents the pivot pin 50 from coming off the insertion holes 34.

Further, the coupling pin 40 inserted into the support holes 23 is a part coupled to the chain C1, with the chain link C11 located on its outer peripheral side. The coupling pin 40 is inserted into the aforesaid support holes 23 while inserted into the ring hole of the chain link C11 as described above. Consequently, the shortening clutch 10 is hooked to the chain C1.

Further, the pivot pin 50 is inserted into the aforesaid insertion holes 34. The pivot pin 50 is a part on which the later-described lock lever 60 is pivotably supported. Accordingly, the pivot pin 50 is also inserted into a shaft hole 61 (to be described later) of the lock lever 60.

Next, the lock lever 60 will be described. By pivoting on the aforesaid pivot pin 50, the lock lever 60 is capable of switching between the locked state in which the chain link C22 is hindered from moving in the escaping direction A and the unlocked state in which the chain link C22 is allowed to move in the escaping direction A. The shaft hole 61 penetrates through the lock lever 60 along the thickness direction (X-direction) of the lock lever 60, and the pivot pin 50 is inserted into the shaft hole 61. Note that the shaft hole 61 corresponds to a pivot point but at least one of the shaft hole 61 and the pivot pin 50 may correspond to the pivot point.

As illustrated in FIG. 2 to FIG. 4, on the upper side (Z1 side) of the shaft hole 61, the lock lever 60 includes a first operating piece 62. The first operating piece 62 is a part that is pushed toward the front side (Y1 side) with a finger or the like in the locked state of the lock lever 60. Note that the first operating piece 62 includes a stopper surface 62a on the front side (Y1 side) in its upper side (Z1 side). The stopper surface 62a is stopped with the rear surface 28a in the urging state of the urging spring 70, thereby restricting the pivoting of the lock lever 60 caused by the urging spring 70.

The lock lever 60 further includes a second operating piece 63 on the lower side (Z2 side) of the shaft hole 61. In the configuration illustrated in FIG. 2 to FIG. 4, the length of the second operating piece 63 is longer than the length of the first operating piece 62. This makes it possible to increase a projection amount of the second operating piece 63 to the rear side (Y2 side) when the lock lever 60 is caused to pivot. However, the length of the second operating piece 63 may be approximately equal to or may be shorter than the length of the first operating piece 62. Note that, in the unlocked state of the lock lever 60, the second operating piece 63 projects to a more rear side (Y2 side) than the pair of leg portions 27a, 27b (refer to FIG. 4, FIG. 8, and so on).

Further, as illustrated in FIG. 4 and so on, a rear surface 64 (Y2-side surface; corresponding to an exposed surface) of the first operating piece 62 and the second operating piece 63 is planar. When the lock lever 60 is in non-operation, the lock lever is located at the accommodation position owing to the urging force of the urging spring 70, and since the rear surface 64 is planar on the first operating piece 62 side and the second operating piece 63 side as described above, it is possible to reduce the projection amount of the rear surface 64-side (Y2-side) portion of the lock lever 60. This makes it possible to prevent the lock lever 60 from inadvertently pivoting.

Further, the second operating piece 63 includes a guiding slope 63a on the front side (Y1 side) of its lower side (Z2 side) in FIG. 4 and so on. The guiding slope 63a is inclined relative to the rear surface 64 so as to more approach the rear surface 64 as it goes toward the lower side (Z2 side). Providing the guiding slope 63a makes it possible to easily guide the movement of the rod-shaped member 80 when the rod-shaped member 80 is positioned in the holding concave portion 66 (to be described later) as will be described later.

The lock lever 60 further includes the locking piece 65. The locking piece 65 projects to a more front side (Y1 side) than the first operating piece 62 and the second operating piece 63. The locking piece 65 includes a pivot restricting surface 65a and a chain abutting end 65b. The pivot restricting surface 65a is a part that collides with a lower end surface 28b of the transverse portion 28. When the chain link C22 moves in the escaping direction (arrow A direction), such a collision restricts the pivoting (anticlockwise pivoting in FIG. 4 and so on) of the chain abutting end 65b with the movement of the chain link C22.

Here, in the locked state, the pivot restricting surface 65a and the lower end surface 28b may come into contact with each other. However, in the locked state, at least one of the chain abutting end 65b and a tip side of the second operating piece 63 may abut on the chain link C22 without the pivot restricting surface 65a and the lower end surface 28b abutting on each other. For example, when the chain link C22 is pulled to the lower side (Z2 side) along a center axis L1, the guiding slope 63a of the second operating piece 63 and the chain link C22 may abut on each other without the pivot restricting surface 65a and the lower end surface 28b abutting on each other.

Further, the chain abutting end 65b is provided on a lower-side (Z2-side) end portion of the locking piece 65. In the locked state of the lock lever 60, the chain abutting end 65b is a part that interferes with the chain link C22 of the other chain C2 when the chain link C22 tries to move in the escaping direction. Here, the chain abutting end 65b is provided such that its positional relation with the pockets 30 in the locked state becomes as illustrated in FIG. 6 and FIG. 7.

Figure 6:
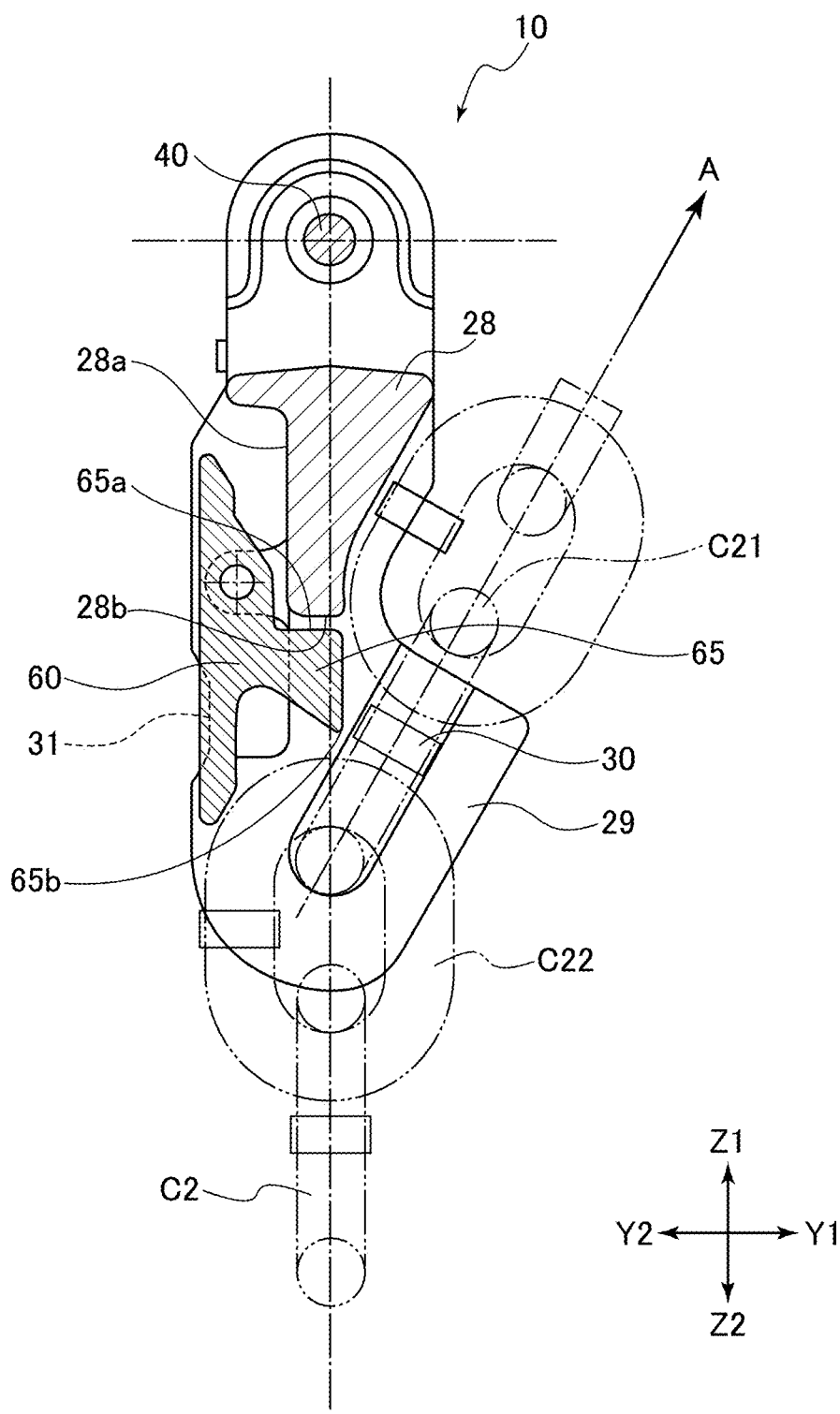
FIG. 6 is a view illustrating a cross section of the shortening clutch illustrated in FIG. 2, taken along the I-I line and illustrating a state in which a chain link is accommodated in pockets in a locked state of a lock lever.
Figure 7:
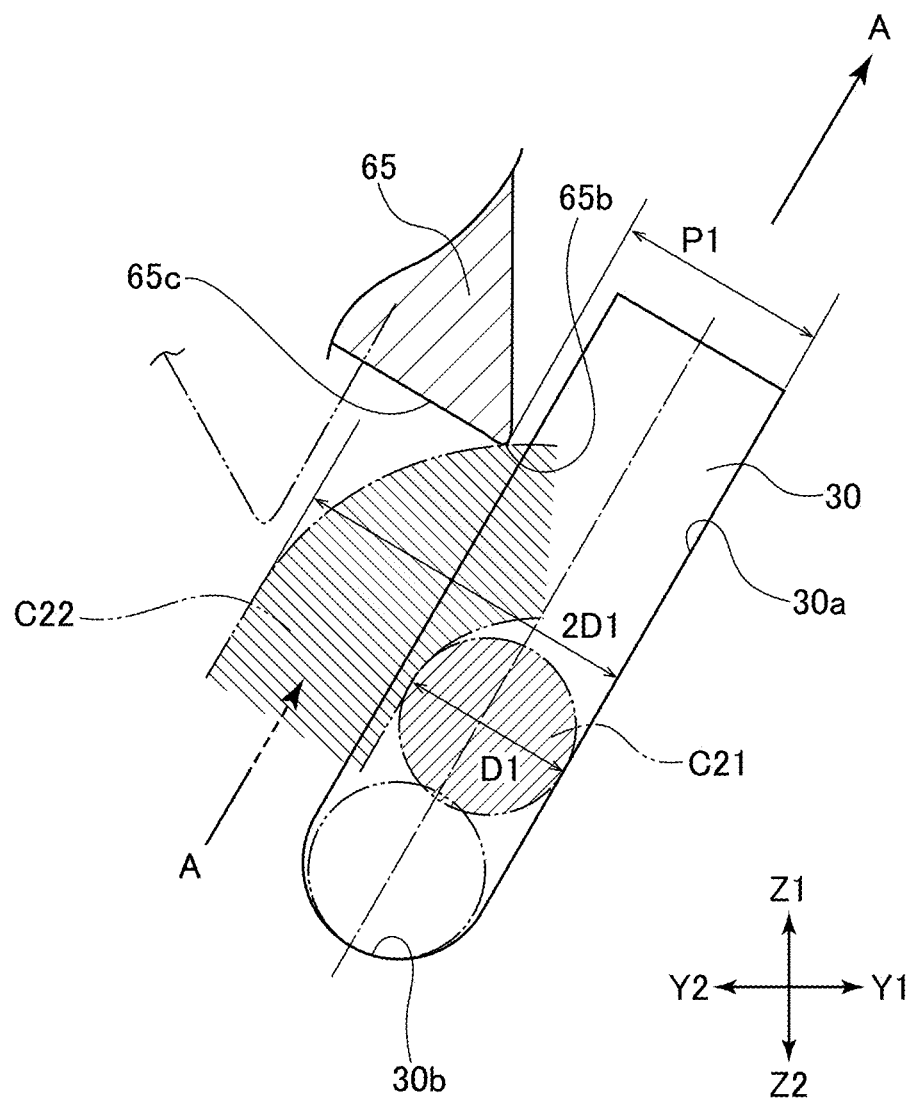
FIG. 7 is an enlarged view illustrating the vicinity of the pocket and a chain abutting end in the locked state illustrated in FIG. 6.

FIG. 6 is a view illustrating a cross section of the shortening clutch 10 illustrated in FIG. 2, taken along the I-I line and illustrating a state in which the chain link C21 is accommodated in the pockets 30 in the locked state of the lock lever 60. FIG. 7 is an enlarged view illustrating the vicinity of the pocket 30 and the chain abutting end 65b in the locked state illustrated in FIG. 6. As illustrated in FIG. 6 and FIG. 7, the width of the pocket 30 orthogonal to the escaping direction (arrow A direction) corresponds to the diameter D1 of the chain link C21 (chain link C22) in the cross section. "Corresponds to the diameter D1" mentioned here indicates that the chain link C21 can be inserted/pulled into/from the pockets 30 without any trouble. Therefore, the presence of a slight clearance in the state in which the chain link C21 is inserted in the pockets 30 is allowed.

A distance P1 between such a chain abutting end 65b and an inner wall side surface 30a is larger than once but less than twice the diameter D1 of the chain link C21. That is, the relation of Expression (1) below holds. Note that the distance P1 is a distance between the chain abutting end 65b and the inner wall side surface 30a when the lock lever 60 is in the locked state.

$$D1<P1<2\times D1 \qquad \text{Expression (1)}$$

However, considering an attachment error, looseness, and dimensional tolerance of the lock lever 60, dimensional tolerance of the pockets 30, dimensional tolerance of the bulges 29, dimensional tolerance of the chain C2, and so on, there is a risk that the chain link C21 escapes from the pockets 30 even if Expression (1) is satisfied. Therefore, Expression (2) below is desirably satisfied.

$$D1<P1<1.4\times D1 \qquad \text{Expression (2)}$$

Moreover, the chain abutting end 65b is located more on the escaping direction (arrow A direction) side than curved bottoms 30b which are bottom sides of the pockets 30. Accordingly, in the locked state of the lock lever 60, when the chain link C21 escapes from the pockets 30, the chain link C22 adjacent on the lower side (Z2 side) collides with the chain abutting end 65b. Even if the chain link C22 tries to move in the escaping direction (arrow A direction) in this state, the collision between the pivot restricting surface 65a and the lower end surface 28b restricts the pivoting of the lock lever 60 in the locked state of the lock lever 60. This hinders the chain link C22 from moving in the escaping direction (arrow A direction).

However, when the chain link C22 is moved from the state illustrated in FIG. 6 and FIG. 7 by an external force, the chain link C22 can move without any interference between the chain abutting end 65b and the chain link C22, and there is a risk that this movement is accompanied by the escaping of the chain link C21 from the pockets 30. Therefore, in order to surely prevent the chain link C21 from escaping from the pockets owing to the external force, it is necessary to satisfy not only Expression (2) above but also later-described Condition (3), Condition (4), and Condition (5). Hereinafter, these will be described in detail.

Figure 8:
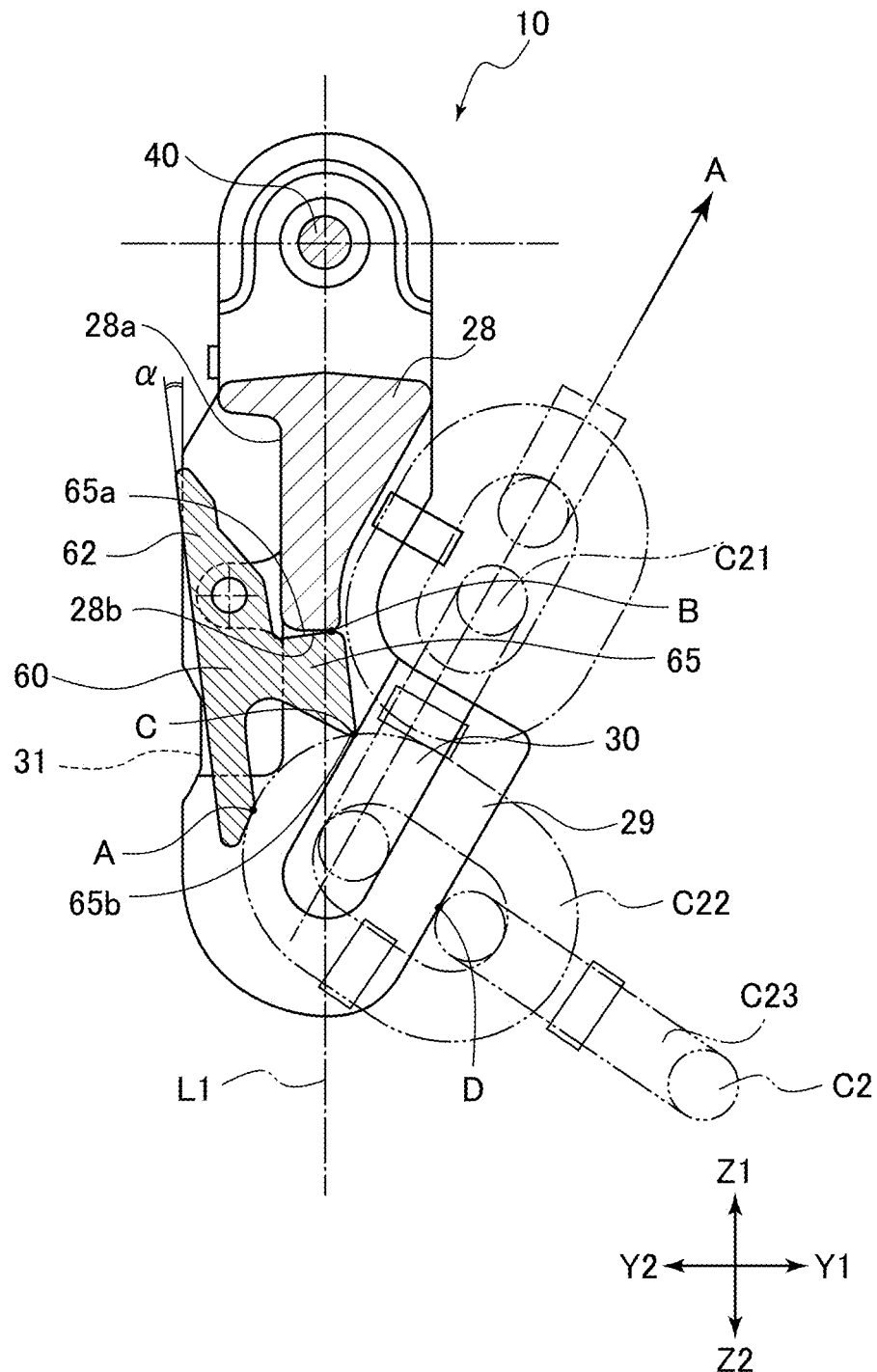
FIG. 8 is a view illustrating the positional relation between chain links and the lock lever when the chain link is pulled out from the pockets, according to this embodiment.

First, let us consider a case where the chain link C22 is gripped with a hand or the like and the chain link C22 is moved toward the second operating piece 63 as illustrated in FIG. 8. When thus moved, the chain link C22 collides with the guiding slope 63a of the second operating piece 63 (a collision point at this time will be referred to as a collision point A) as illustrated in FIG. 8. Here, a chain link coupled to the chain link C22 and different from the chain link C21 accommodated in the pockets 30 will be referred to as a chain link C23 (corresponding to a third chain link). The chain link C23 is located more on the lower side (Z2 side) than the chain link C22 in terms of a hanging direction unless an external force is applied, for example, unless it is gripped with a hand. As illustrated in FIG. 8, the chain link C23 collides with the bulges 29 at a collision point D.

Incidentally, in FIG. 8, the lower end side (Z2 side) of the chain link C21 is slightly apart from the bottoms (deepest portions) of the pockets 30, and accordingly the chain link C22 and the chain abutting end 65b are in contact with each other at a contact point C (corresponding to a first collision point). However, if the lower end side (Z2 side) of the chain link C21 is present at the bottoms (deepest portions) of the pockets 30, the chain link C22 and the chain abutting end 65b need not be in contact with each other, and in this case as well, moving the chain link C22 toward the second operating piece 63 results in the collision of the guiding slope 63a and the chain link C22 at the collision point A.

Even if an attempt is made to move the chain link C22 toward the second operating piece 63, the above-described collision of the chain link C23 and the bulges 29 at the collision point D does not allow the chain link C22 to move toward the second operating piece 63 furthermore. In other words, even if the chain link C22 is pushed toward the second operating piece 63 in order to cause the clockwise pivoting of the lock lever 60 for unlocking, the collision at the collision point D inhibits the pushing. At this time, the second operating piece 63 does not pivot clockwise in FIG. 8 after it becomes parallel to the center axis L1 of the main body 20.

Condition (3) below summarizes the above.

Condition (3) Owing to the collision of the chain link C23 with the bulges 29, the second operating piece 63 colliding with the chain link C22 at the collision point A does not further pivot in the direction in which it is pushed from the chain link C22 (clockwise in FIG. 8) after it becomes parallel to the center axis L1.

Next, let us consider a case where the chain link C22 is caused to pivot anticlockwise in FIG. 8 instead of the case where the chain link C22 is pushed toward the second operating piece 63. Specifically, the chain link C23 is gripped with a hand or the like and, as illustrated in FIG. 8, is caused to pivot anticlockwise together with the chain link C22 from the hanging state so as to be inclined relative to the center axis L1 which is along the up-down direction (vertical direction; Z direction).

In this case as well, the chain link C23 collides with the bulges 29 at the collision point D in FIG. 8 at a tilt angle smaller than that when its direction becomes a horizontal direction orthogonal to the center line L1. Accordingly, even if the chain link C22 tries to pivot anticlockwise in FIG. 8, the chain link C23 colliding with the bulges 29 at the collision point D hinders the further anticlockwise pivoting of the chain link C22. In other words, the dimension of the outer peripheral surfaces of the bulges 29 is set so as to restrict the pivoting of the chain link C22. Note that the collision at the collision point D illustrated in FIG. 8 is set so as to prevent the chain link C22 from pivoting until its longitudinal direction becomes beyond the horizontal direction (pivoting by over 90 degrees from the hanging state) even if the chain link C22 is caused to pivot anticlockwise from the hanging state.

Condition (4) below summarizes the above.

Condition (4) The chain link C23 collides with the bulges 29, thereby preventing the chain link C22 from pivoting from the hanging state by over 90 degrees.

Next, let us consider a case where an attempt is made to move the chain link C21 in the escaping direction A in the state illustrated in FIG. 8. At this time, if the chain link C22 and the chain abutting end 65b abut on each other and the lock lever 60 pivots anticlockwise in FIG. 8, the locked state of the lock lever 60 is not canceled. A reason for this is as follows. If the lock lever 60 pivots anticlockwise in FIG. 8, the pivot restricting surface 65a and the lower end surface 28b collide with each other at the collision point B illustrated in FIG. 8. This prevents the lock lever 60 from further pivoting anticlockwise.

Here, it is obvious from Expression (2) above that the chain abutting end 65b collides with the chain link C22. However, if the lock lever 60 pivots in the unlocking direction at the time of the collision, the chain link C21 escapes from the pockets 30. The following describes a condition under which the chain link C21 does not escape from the pockets 30 even if the chain link C21 is moved in the escaping direction A after the chain abutting end 65*b* collides with the chain link C22.

Figure 9:
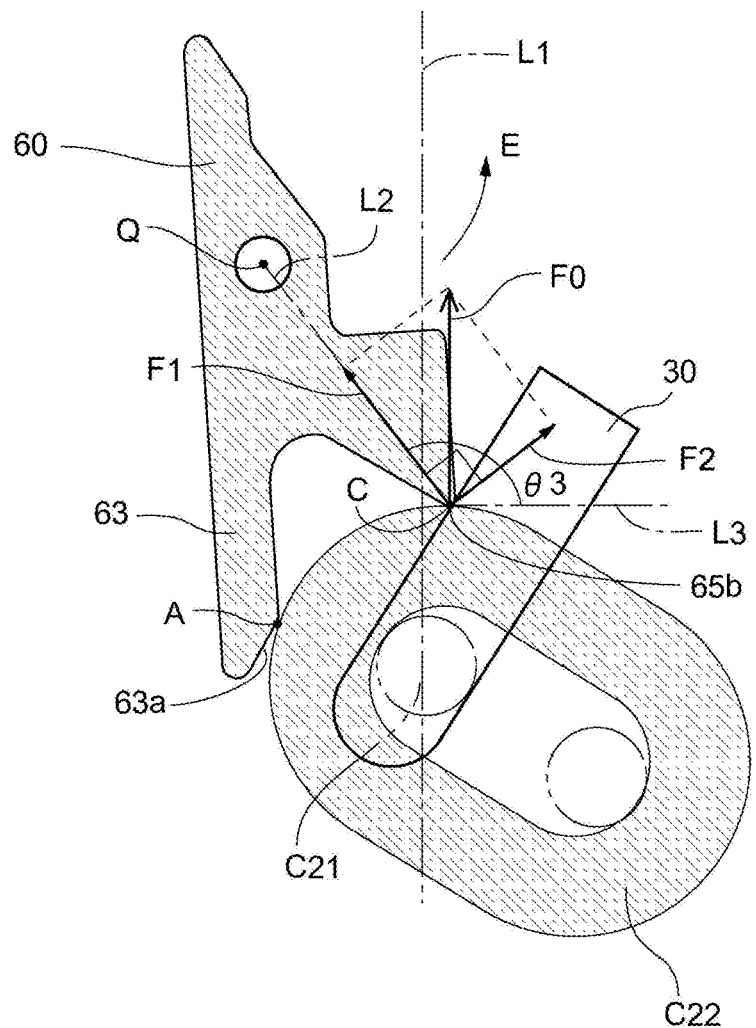
FIG. 9 is a view illustrating a state of force transmission by the contact between the chain link and the lock lever, according to this embodiment.

First, in FIG. 9, let a rotation center of the lock lever 60 be a rotation center Q. Further, let a contact point (collision point) between the chain link C22 and the chain abutting end 65*b* be a contact point C, and let a line connecting the contact point C and the rotation center Q be a virtual line L2.

In the state illustrated in FIG. 9, the lock lever 60 receives a pressing force F0 from the chain link C22, and the direction of the pressing force F0 is a direction perpendicular to a tangent L3 passing through the contact point C where the chain abutting end 65*b* and the chain link C22 are in contact with each other. This pressing force F0 is divided into a component force F1 directed from the contact point C toward the rotation center Q of the lock lever 60 and a component force F2 directed orthogonally to the component force F1 (virtual line L2) from the contact point C.

Here, in the state illustrated in FIG. 9, the pressing force F0 is not inclined more relative to the center axis L1 than the virtual line L2. At this time, the component force F2 is a force in such a direction as to cause the lock lever 60 to pivot in the arrow E direction (anticlockwise in FIG. 9). Accordingly, in the case where the chain link C21 is moved in the escaping direction A and, with this movement, chain link C22 moves along the escaping direction A, the lock lever 60 pivots in the arrow E direction owing to the action of the component force F2, and the pivot restricting surface 65*a* and the lower end surface 28*b* collide with each other at a position indicated by B point illustrated in FIG. 8, so that the lock lever 60 does not further pivot anticlockwise. Consequently, the locked state of the lock lever 60 is achieved, not allowing the chain link C22 to pass between the inner wall side surfaces 30*a* and the chain abutting end 65*b* and also inhibiting the chain link C21 from moving in the escaping direction A. In this way, the chain link C21 is surely prevented from escaping from the pockets 30.

Note that, in FIG. 9, let an angle between the virtual line L2 and the tangent L3 be an angle θ3. As is apparent from FIG. 9, the angle θ3 is obtuse. Here, in a case where the angle θ3 is a right angle, the tangent L3 is orthogonal to the virtual line L2, and accordingly, the pressing force F0 and the component force F1 coincide with each other, and the component force F2 is 0.

Here, the direction of the pressing force F0 is the direction perpendicular to the tangent L3 as described above, and therefore, in a case where the rotation center Q is at such a position that the angle θ3 becomes acute, the pressing force F0 is inclined relative to the center axis L1 more than the virtual line L2. In this case, the component force F2 orthogonal to the component force F1 acts as a force that causes the lock lever 60 to pivot in an opposite direction to the arrow E direction. Therefore, in the case where the angle θ3 is acute, the component force F2 tries to cause the lock lever 60 to pivot in the unlocking direction, making it easy for the chain link C22 to pass between the inner wall side surfaces 30*a* and the chain abutting end 65*b* and also allowing the chain link C21 to move in the escaping direction A.

Condition (5) below summarizes the above.

Condition (5) The pressing force F0 is not inclined more relative to the center axis L1 than the virtual line L2.

Alternatively, in the locked state in which the pivot restricting surface 65*a* and the lower end surface 28*b* collide with each other and the chain abutting end 65*b* and the chain link C22 collide with each other, the virtual line L2 connecting the contact point C of the chain link C22 and the chain abutting end 65*b*, and the rotation center Q of the lock lever 60 makes an obtuse angle with the tangent L3 at the contact point C.

Note that, in the state illustrated in FIG. 9 and when the chain link C22 hangs down, the guiding slope 63*a* and the chain link C22 are in contact with each other at the contact point A. At this time, the lock lever 60 is inclined so as to make an angle α with a line parallel to the center axis L1 as illustrated in FIG. 8. If this angle α is large, the first operating piece 62 side in FIG. 8 projects from the main body 20. Therefore, the angle α is not set very large. Note that the angle α is an angle close to 0 degrees but may be 0 degrees.

Figure 10:
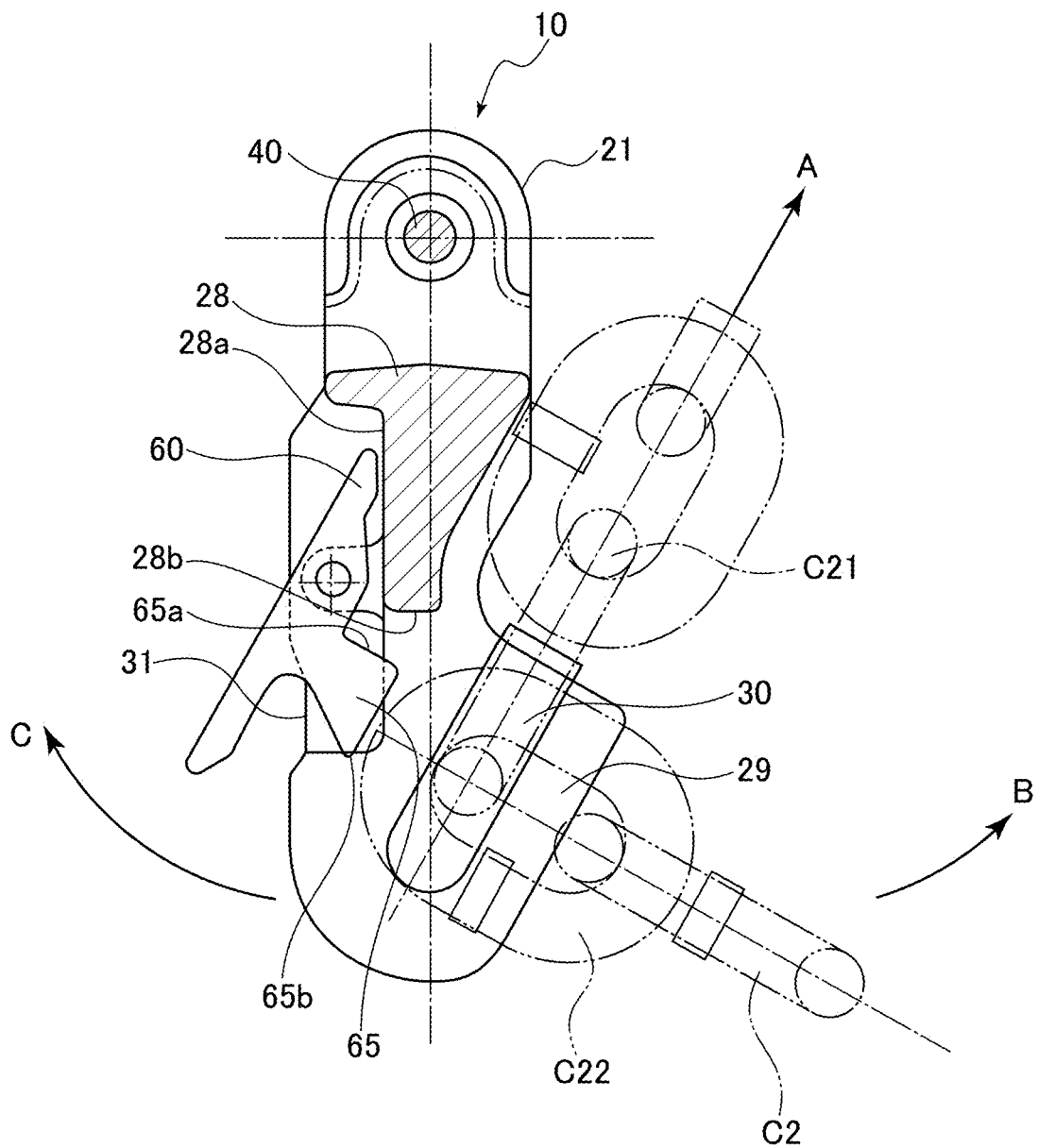
FIG. 10 is a view illustrating a cross section of the shortening clutch illustrated in FIG. 2, taken along the I-I line and illustrating a state in which the chain link is accommodated in the pockets in an unlocked state of the lock lever.

FIG. 10 is a view illustrating a cross section of the shortening clutch 10 illustrated in FIG. 2, taken along the I-I line and illustrating the state in which the chain link C21 is accommodated in the pockets 30 in the unlocked state of the lock lever 60. As is apparent from FIG. 10, in the unlocked state of the lock lever 60, a distance P1 (refer to FIG. 7) between the chain abutting end 65*b* and the inner wall side surface 30*a* is larger than twice the diameter D1 of the chain link C21. This allows the chain link 21 and the chain link C22 to easily move in the escaping direction (arrow A direction).

Further, between the second operating piece 63 and the locking piece 65, the holding concave portion 66 is provided. Specifically, a front surface 63*b* which is a front-side (Y1-side) surface of the second operating piece 63 and a lower surface 65*c* which is a lower-side (Z2-side) surface of the locking piece 65 in the locked state make an acute angle. Further, on a root side of the front surface 63*b* and the lower surface 65*c*, the curved surface 67 smoothly connecting with these is provided. These front surface 63*b*, lower surface 65*c*, and curved surface 67 form the holding concave portion 66.

Here, as illustrated in FIG. 10, in the unlocked state of the lock lever 60, the curved surface 67 of the holding concave portion 66 is exposed to the outside. This makes it possible to position the rod-shaped member 80 in the holding concave portion 66 so as to also be in the recesses 31. Consequently, it is possible to keep the unlocked state of the lock lever 60.

Figure 11:
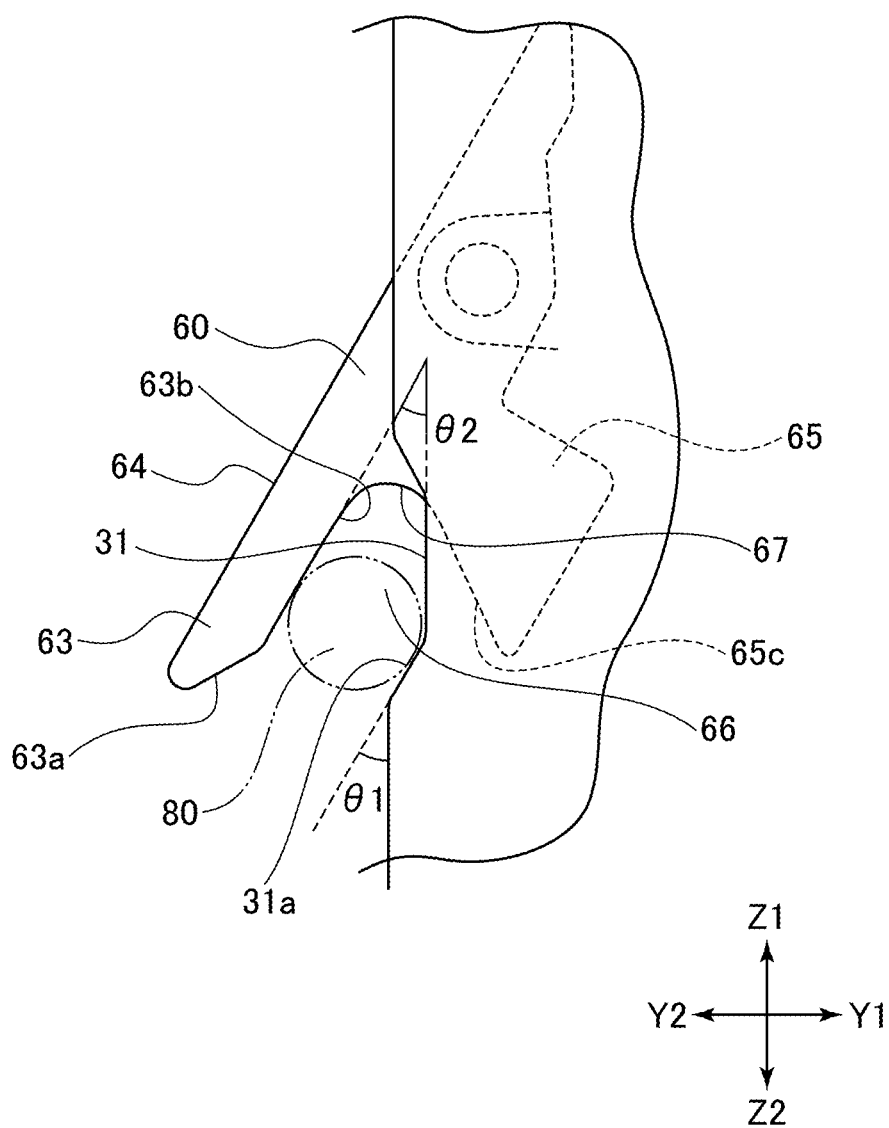
FIG. 11 is a view illustrating a state of a tilt angle of a front surface of a second operating piece when the lock lever is inclined to the maximum degree and a tilt angle of a sloping surface.

Incidentally, a tilt angle of parts where the sloping surfaces 31*a* in the lower side (Z2 side) of the aforesaid recesses 31 are inclined most relative to the up-down direction (Z-direction) (slope tilt angle θ1) is set substantially equal to the maximum tilt angle that the front surface 63*b* of the second operating piece 63 has relative to the up-down direction (Z-direction) when inclined at the maximum (tilt angle θ2), or the slope maximum angle θ1 is set larger than the tilt angle θ2. This state is illustrated in FIG. 11. FIG. 11 is a view illustrating the state of the tilt angle of the front surface 63*b* of the second operating piece 63 when the lock lever 60 is inclined at the maximum (tilt angle θ2) and the tilt angle of the sloping surface 31*a* (tilt angle θ1).

As illustrated in FIG. 11, owing to the urging force of the later-described urging spring 70, the lock lever 60 tries to pivot so as to reduce its tilt angle relative to the up-down direction (Z-direction). Accordingly, if the slope tilt angle θ1 is smaller than the tilt angle θ2, when the rod-shaped member 80 is positioned in the holding concave portion 66, a force in such a direction as to expel the rod-shaped member 80 toward the lower side (Z2 side) acts since the urging spring 70 tries to cause the lock lever 60 to rotate. However, if the slope tilt angle θ1 is substantially equal to or larger than the tilt angle θ2, a force to move the rod-shaped member 80 to the upper side (Z1 side) acts when the urging spring 70 tries to cause the lock lever 60 to rotate. Accordingly, when the rod-shaped member 80 is positioned in the holding concave portion 66, it is possible to stably hold the rod-shaped member 80.

Further, the lock lever 60 is given the urging force by the urging spring 70 (corresponding to an urging member) illustrated in FIG. 3. The urging spring 70 is a torsion spring and gives the lock lever 60 the urging force for maintaining the locked state. In the configuration illustrated in FIG. 3, stopper pieces 71 on end sides of the urging spring 70 abut on the rear surface 28*a*, and a stopper portion 72 of the urging spring 70 abuts on the front side (Y1 side) of the first operating piece 62. However, the urging spring 70 is not limited to such a configuration and that with any other configuration such as a coil spring or a leaf spring can be employed.

2. Regarding Operation

In the shortening clutch 10 as configured above, in the state before the chain link C21 is inserted into the pockets 30, the lock lever 60 is located in the locked state owing to the urging force of the urging spring 70. In this locked state, the chain link C21 is inserted into the pockets 30. Then, the chain link C22 adjacent to the chain link C21 collides with some part of the locking piece 65, and at this time, the lock lever 60 is caused to pivot against the urging force of the urging spring 70 so as to cancel the locked state of the lock lever 60. Consequently, the chain link C21 is inserted in the pockets 30.

Further, when the chain link C22 is located more on a lower side (Z2 side) than the chain abutting end 65*b*, the lock lever 60 is caused to pivot into the locked state by being urged by the urging spring 70.

Further, to remove the other chain C2 from the shortening clutch 10, a user pushes the first operating piece 62 toward the front side (Y1 side) or puts his/her finger on the guiding slope 63*a*, the front surface 63*b*, or the like of the second operating piece 63 to cause the second operating piece 63 to pivot toward the rear side (Y2 side). When the distance P1 between the chain abutting end 65*b* and the inner wall side surfaces 30*a* exceeds twice the diameter D1 of the chain links C21, C22 as a result of this pivoting, the two chain links C21, C22 are capable of slipping (passing) through the space between the chain abutting end 65*b* and the inner wall side surfaces 30*a*. In this state, while the main body 20 is pulled in the direction indicated by the arrow C in FIG. 10, the other chain C2 is pulled in the direction indicated by the arrow B in FIG. 10. Then, the chain links C21, C22 pass through the space between the chain abutting end 65*b* and the inner wall side surfaces 30*a*. Consequently, it is possible to remove the other chain C2 from the shortening clutch 10.

In particular, in this embodiment, owing to the presence of the second operating piece 63 in the lock lever 60, it is possible to perform the pulling operation so as to cause the second operating piece 63 to pivot toward the rear side (Y side) by putting the finger or the like on the guiding slope 63*a*, the front surface 63*b*, or the like. In this case, the operation of causing the lock lever 60 to pivot in the unlocking direction can also serve as the operation of pulling the main body 20 in the direction indicated by the arrow C in FIG. 10, making it possible to perform these operations with one hand.

Further, the above-described removal of the other chain C2 can also be performed as follows. Specifically, the user pushes the first operating piece 62 toward the front side (Y1 side) or puts his/her finger on the guiding slope 63*a*, the front surface 63*b*, or the like of the second operating piece 63 to cause the second operating piece 63 to pivot toward the rear side (Y2 side). Then, after the lock lever 60 pivots, the rod-shaped member 80 is positioned in the recesses 31 and the holding concave portion 66. At this time, since the urging spring 70 tries to return the lock lever 60 to the locked state (closed state) from the unlocked state, the rod-shaped member 80 is sandwiched between the lock lever 60 and the recesses 31. Therefore, it is possible to maintain the unlocked state of the lock lever 60 even if the user lets his/her hand off the rod-shaped member 80.

Thereafter, it is possible to remove the other chain C2 from the shortening clutch 10 in the same way as that described above.

3. Regarding Effects

The shortening clutch 10 as configured above is the shortening clutch 10 for connecting the chain C1 and the other chain C2 and has the main body 20 coupled to the chain C1 and including the pockets 30 for accommodating the chain link C21 (first chain link) of the other chain C2. The shortening clutch 10 further includes the lock lever 60 which is pivotably attached to the main body 20 through the shaft hole 61 or the pivot pin 50 (pivot point), is capable of switching between the locked state and the unlocked state by pivoting, and in the locked state, restricts the disengagement of the chain link C21 (first chain link) accommodated in the pockets 30, from the pockets 30, while in the unlocked state, allowing the chain link C21 (first chain link) to disengage from the pockets 30. Further, the lock lever 60 includes: the locking piece 65 which, in the locked state, projects from the shaft hole 61 (pivot point) to the pockets 30 side, the locking piece 65 being projecting toward the position where the locking piece 65 restricts the movement, in the escaping direction of the pockets 30, of the chain link C22 (second chain link) coupled adjacently to the chain link C21 (first chain link) accommodated in the pocket 30; the first operating piece 62 extending from the shaft hole 61 (pivot point) toward the side where the chain C1 is coupled; and the second operating piece 63 extending from the shaft hole 61 (pivot point) toward the opposite side to the side where the chain C1 is coupled.

Therefore, not only by causing the lock lever 60 to pivot by pushing the first operating piece 62 to the front side (Y1 side) but also by causing the second operating piece 63 to pivot so as to be pulled toward the rear side (Y2 side), it is possible to cause the lock lever 60 to pivot into the unlocked state from the locked state. Therefore, since it is possible to perform the operation of causing the lock lever 60 to pivot in the unlocking direction and the operation of pulling the main body 20 in the direction indicated by the arrow C in FIG. 10 with one operation, these operations can be performed with one hand. Therefore, it is possible to improve operability when removing the chain links C21, C22 from the pockets 30.

Further, in this embodiment, the lock lever 60 includes the rear surface 64 (exposed surface) exposed outward from the main body 20, and the rear surface 64 (exposed surface) is planarly provided along the first operating piece 62 and the second operating piece 63.

Therefore, in the locked state of the lock lever 60, it is possible to prevent the lock lever 60 from projecting from the surface of the main body 20 (the pair of legs 27*a*, 27*b*) or to reduce the projection amount of the rear surface-side (Y2-side) portion of the lock lever 60 unless the lock lever 60 is inclined by an external force applied to the lock lever 60, or the like. This can prevent the lock lever 60 from pivoting inadvertently by receiving an external impact or the like.

Further, in this embodiment, in the state in which the chain link C21 (first chain link) is fitted up to the deepest portions of the pockets 30, the second operating piece 63 is pressed by the chain link C22 (second chain link) to pivot without the locking piece abutting on the main body 20 (lower end surface 28b). On the other hand, in the case where the chain link 21 (first chain link) moves in the escaping direction from the deepest portions of the pockets 30, the urging spring 70 (urging member) causes the lock lever 60 to pivot to make the locking piece 65 abut on the main body 20 (lower end surface 28b).

Therefore, even if the chain link C21 (first chain link) moves in the escaping direction from the deepest portions of the pockets 30, the locking piece 65 abuts on the main body 20 (lower end surface 28b) owing to the urging of the urging spring 70 (urging member), making it possible to surely prevent the chain link C21 (first chain link) from escaping from the pockets 30.

Further, in the other chain C2, the chain link C23 (third chain link) different from the chain link C21 (first chain link) is coupled to the chain link C22 (second chain link). Further, the main body 20 includes the bulges 29 around the pockets 30, and the bulges 29 come into contact with the chain link C23 (third chain link) (corresponding to Condition (3)). Therefore, the chain link C22 (second chain link) moves toward the second operating piece 63 so as to prevent the lock lever 60 from pivoting in the unlocking direction.

Further, the main body 20 includes the pair of leg portions 27a, 27b facing each other and the transverse portion 28 provided between the pair of leg portions 27a, 27b. Further, the locking piece 65 includes: the pivot restricting surface 65a which collides with the transverse portion 28; and the chain abutting end 65b which collides with the chain link C22 (second chain link) when the chain link C22 (second chain link) moves in the escaping direction A. Then, in the locked state in which the chain abutting end 65b and the chain link C22 (second chain link) collide with each other at the contact point C (first collision point), the angle θ3 of the virtual line L2 connecting the rotation center Q of the lock lever 60 and the contact point C (first collision point) relative to the tangent L3 of the chain link C22 (second chain link) at the contact point C is obtuse.

Therefore, as described based on FIG. 9, even if the lock lever 60 receives the pressing force F0 from the chain link C22 (second chain link), the component force F2, of the pressing force F0, whose direction is orthogonal to the virtual line L2, becomes the force in such a direction as to cause the lock lever 60 to pivot into the locked state (anticlockwise in FIG. 9). Therefore, it is possible to prevent the lock lever 60 from pivoting in the unlocking direction, making it possible to maintain the locked state of the lock lever 60.

Further, in this embodiment, the lock lever 60 includes the guiding slope 63a which is inclined so as to more approach the rear surface 64 (exposed surface) as it goes more apart from the shaft hole 61 (pivot point). Therefore, at the time of positioning the rod-shaped member 80 in the holding concave portion 66, it is possible to easily guide the movement of the rod-shaped member 80.

Further, in this embodiment, the main body 20 includes the pair of leg portions 27a, 27b facing each other, and in the lever arrangement space 33 present between the pair of leg portions 27a, 27b, the lock lever 60 is disposed. Further, in the pair of leg portions 27a, 27b, the recesses 31 dented from the surfaces of the pair of leg portions 27a, 27b are provided, and between the second operating piece 63 and the locking piece 65, the holding concave portion 66 which, in the locked state, communicates with the recesses 31 present in the pair of leg portions 27a, 27b respectively is provided.

Therefore, by positioning the rod-shaped member 80 such as, for example, a driver along both the recesses 31 and the holding concave portion 66, it is possible to maintain the unlocked state of the lock lever 60. In this case, even in the state in which the finger or the like is detached from the lock lever 60, it is possible to maintain the unlocked state, making it possible to further improve operability when removing the chain links C21, C22 from the pockets 30.

Further, in this embodiment, the recesses 31 include the sloping surfaces 31a inclined relative to the surfaces of the pair of leg portions 27a, 27b, and the slope tilt angle θ1 of the sloping surfaces 31a relative to the surfaces is larger than the maximum tilt angle θ2 that the lock lever 60 has when inclined most in the unlocked state. Therefore, when the urging spring 70 tries to cause the lock lever 60 to pivot, the force in such a direction as to move the rod-shaped member 80 to the upper side (Z1 side) acts. Therefore, when the rod-shaped member 80 is positioned in the holding concave portion 66, the rod-shaped member 80 can be stably held without disengaging.

4. Modification Example

Hitherto, one embodiment of the present invention has been described, but besides this, various modifications can be made in the present invention. The following describes these.

The above-described embodiment assumes that the chain link C21 (chain link C22) has a circular cross section. However, the cross-sectional shape of the chain link C21 (chain link C22) is not limited to the circular shape and may be, for example, an oval shape including an elliptical shape. In this case, the "diameter D1" may be any dimension that the chain link C21 (chain link C22) can have in the cross section of the chain link C21 (chain link C22) when the chain link C21 and the chain link C22 become adjacent to each other.

Further, in the above-described embodiment, maintaining the unlocked state (open state) of the lock lever 60 is achieved by the rod-shaped member 80 inserted into the holding concave portion 66 and the recesses 31, for instance. However, the shortening clutch may have a configuration not requiring the rod-shaped member 80 yet capable of maintaining the unlocked state (open state) of the lock lever 60. An example of such a configuration is illustrated in FIG. 12 and FIG. 13.

Figure 12:
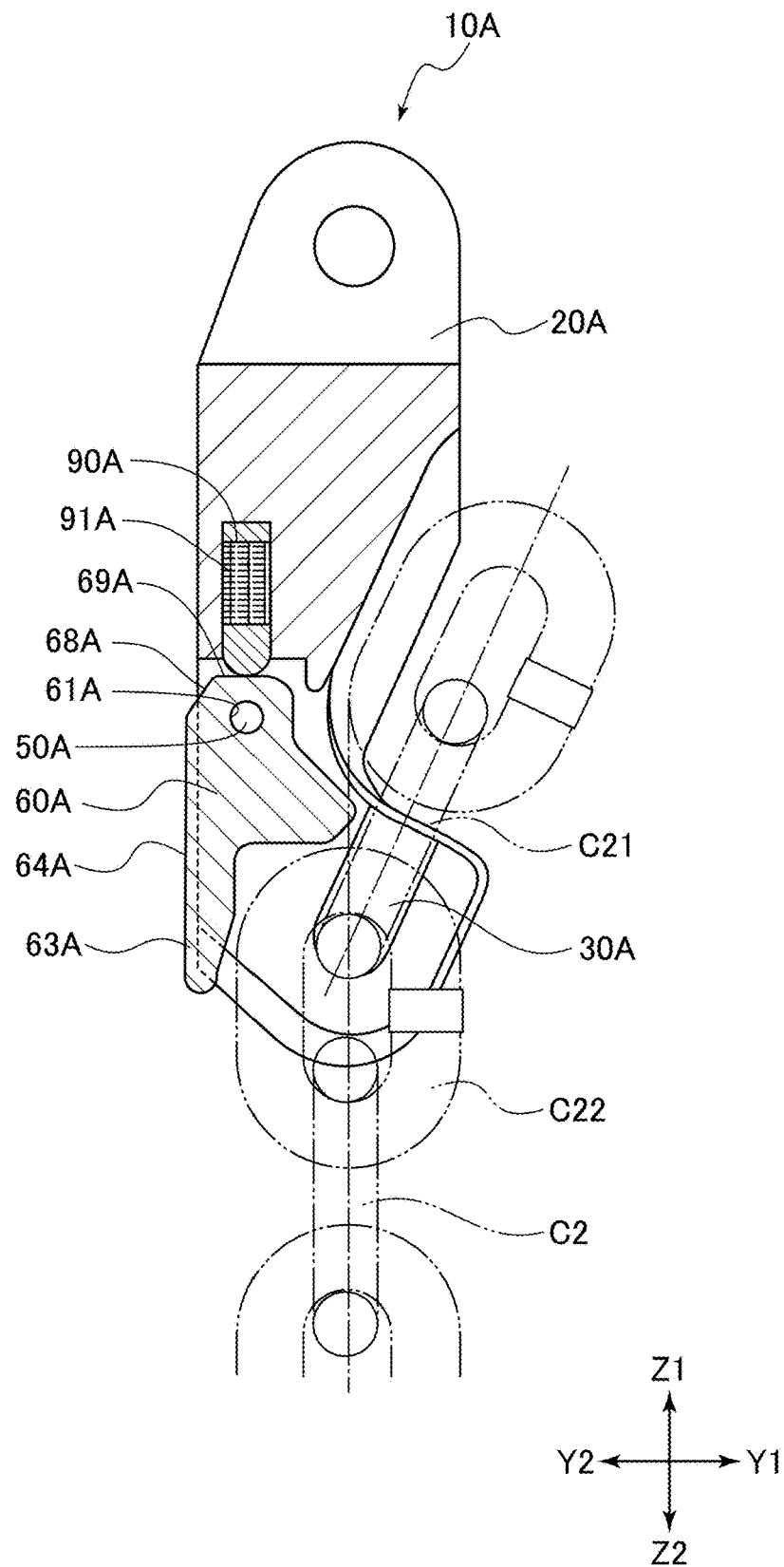
FIG. 12 is a side view illustrating the configuration of a shortening clutch according to a modification example of the present invention and is a view illustrating a state in which a lock lever is in a locked state (closed state).
Figure 13:
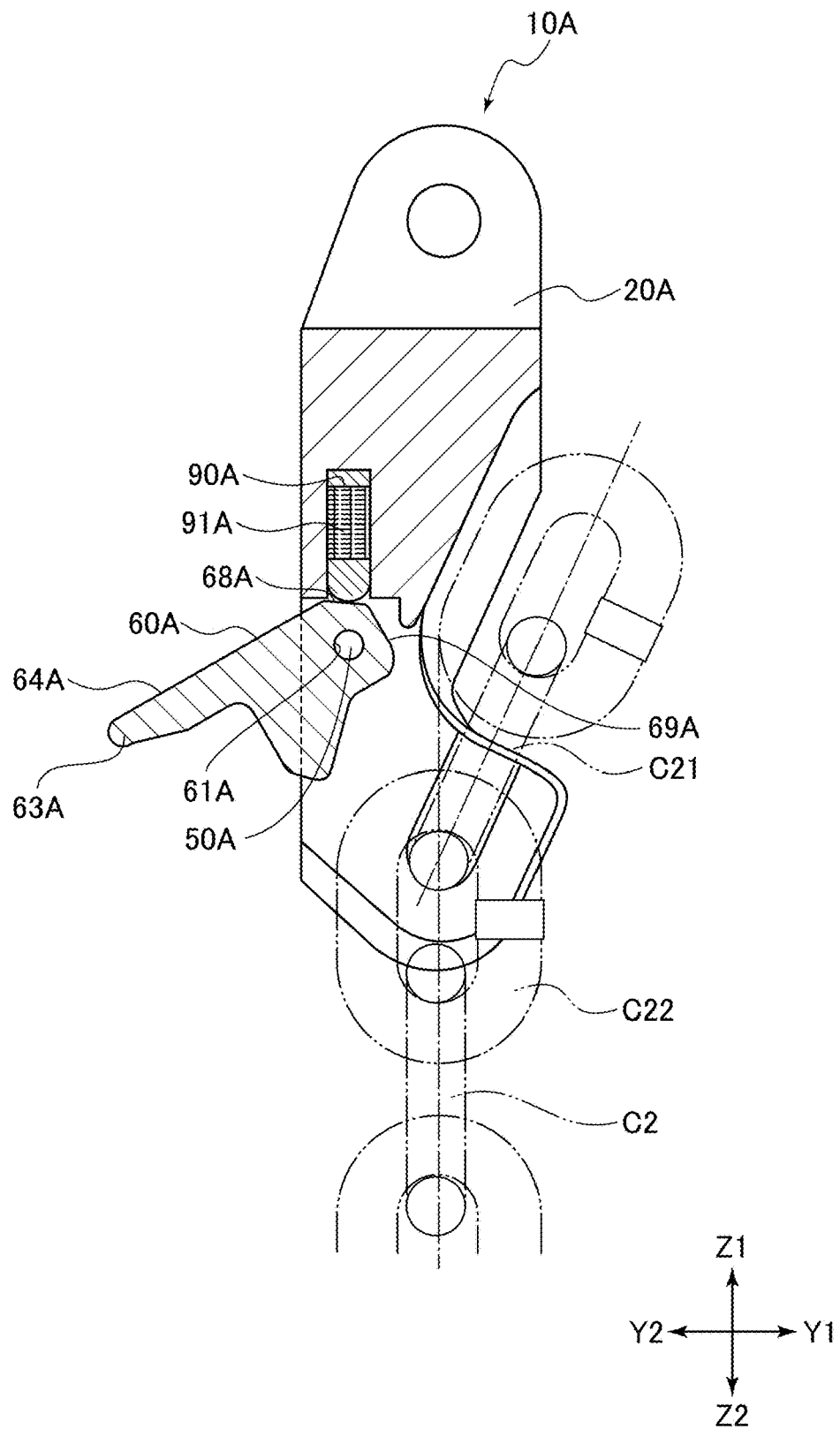
FIG. 13 is a view illustrating a state in which the lock lever is in an unlocked state (open state) in the shortening clutch illustrated in FIG. 10.

FIG. 12 is a side view illustrating the configuration of a shortening clutch 10A according to a modification example of the present invention and is a view illustrating a state in which a lock lever 60A is in a locked state (closed state). FIG. 13 is a view illustrating a state in which the lock lever 60A is in an unlocked state (open state) in the shortening clutch 10A illustrated in FIG. 12.

As illustrated in FIG. 12, a pressing mechanism 90A having an urging spring 91A is attached to a main body 20A. Note that the pressing mechanism 90A corresponds to a posture maintaining means. The pressing mechanism 90A is a mechanism that gives the lock lever 60A an urging force of the urging spring 91A, and this operation of the pressing mechanism 90A can maintain the locked state (closed state) and the unlocked state (open state) of the lock lever 60A.

The lock lever 60A includes an unlocking sloping surface 68A (corresponding to a second position) which is a side surface inclined relative to a rear surface 64A. The pressing mechanism 90A gives the urging force to the unlocking sloping surface 68A, thereby capable of maintaining the unlocked state (open state) in which an operating piece 63A corresponding to the second operating piece 63 projects greatly outward while inclined relative to the main body 20A. At this time, it is possible to take out the chain link C21 accommodated in pockets 30A. Since it is possible to maintain the unlocked state (open state) by the pressing mechanism 90A thus giving the urging force to the unlocking sloping surface 68A, it is possible to improve operability when removing the chain links C21, C22 from the pockets 30. Further, operability in attaching the chain C2 is also improved.

Further, the pressing mechanism 90A corresponding to the posture maintaining means is a mechanism that gives the urging force of the urging spring 91A. Therefore, in spite of the simple configuration, it is possible to maintain both the locked state (closed state) and the unlocked state (open state).

Further, the lock lever 60A includes the operating piece 63A which, in the locked state, extends from a pivot point toward a side opposite to a side where one chain is coupled. This facilitates the operation of causing the operating piece 63A to pivot toward the rear side (Y2 side), making it possible to easily switch between the locked state (closed state) and the unlocked state (open state).

Further, the lock lever 60A also includes a locking abutting surface 69A (corresponding to a first position) which is a side surface orthogonal to the rear surface 64A or slightly inclined so as to more approach the lower side (Z2 side) as it goes toward the front side (Y1 side). Then, the locking abutting surface 69A (first position) maintains the locked state of the lock lever 60A by being given the force from the pressing mechanism 90A (posture maintaining means). Therefore, it is possible not to allow the removal of the chain link C21 accommodated in the pockets 30A.

Further, the lock lever 60A also includes the unlocking sloping surface 68A (second position) present at a different position from the aforesaid locking abutting surface 69A (first position). The unlocking sloping surface 68A (second position) maintains the unlocked state of the lock lever 60A by being given the force from the pressing mechanism 90A (posture maintaining means). Therefore, even if the user lets his/her hand off the lock lever 60A, it is possible to maintain the unlocked state of the lock lever 60A, making it possible to improve operability when removing the chain links C21, C22 from the pockets 30.

Note that, in the configuration illustrated in FIG. 12 and FIG. 13, to maintain the locked state, the pressing mechanism 90A gives the urging force to the locking abutting surface 69A. Further, to maintain the unlocked state, the pressing mechanism 90A gives the urging force to the unlocking sloping surface 68A. However, to maintain the locked state and the unlocked state, a different configuration may be adopted. For example, a magnetic force may maintain the locked state and the unlocked state.

The invention claimed is:

1. A shortening clutch for connecting one chain and another chain, the shortening clutch comprising:
a main body coupled to the one chain and including a pocket for accommodating a first chain link of the another chain; and
a lock lever which is pivotably attached to the main body through a pivot point having an urging member, is capable of switching between a locked state and an unlocked state by pivoting, and in the locked state, restricts disengagement of the first chain link accommodated in the pocket, from the pocket, while in the unlocked state in which the lock lever resists an urging force of the urging member, allowing the first chain link to disengage from the pocket,
wherein the lock lever includes:
a locking piece which, in the locked state, projects from the pivot point to the pocket side, in which the locking piece projects toward a position where the locking piece restricts movement of a second chain link of the another chain in an escaping direction, and the second chain link is adjacently coupled, on a side opposite to the escaping direction of the first chain link, to the first chain link accommodated in the pocket;
a first operating piece extending from the pivot point toward a side where the one chain is coupled; and
a second operating piece extending from the pivot point toward a side opposite to the side where the one chain is coupled.

2. The shortening clutch according to claim 1,
wherein the lock lever includes an exposed surface exposed outward from the main body, and
wherein the exposed surface is provided planarly along the first operating piece and the second operating piece.

3. The shortening clutch according to claim 1,
wherein, in a state in which the first chain link is fitted up to a deepest portion of the pocket, the second operating piece is pressed by the second chain link so that the locking piece is pivoted no to abut on the main body, and
wherein, when the first chain link moves in the escaping direction from the deepest portion of the pocket, the urging member causes the lock lever to pivot to make the locking piece abut on the main body.

4. The shortening clutch according to claim 1,
wherein the another chain has a third chain link different from the first chain link and coupled to the second chain link,
wherein the main body includes a bulge on a periphery of the pocket,
wherein the bulge comes into contact with the third chain link to inhibit the lock lever from pivoting in an unlocking direction due to movement of the second chain link toward the second operating piece,
wherein the main body includes a pair of leg portions facing each other and a transverse portion provided between the pair of leg portions,
wherein the locking piece includes: a pivot restricting surface which collides with the transverse portion; and a chain abutting end which collides with the second chain link when the second chain link moves in the escaping direction, and
wherein, in the locked state in which the chain abutting end and the second chain link collide with each other at a first collision point, a virtual line connecting a rotation center of the lock lever and the first collision point makes an obtuse angle with a tangent of the second chain link at the first collision point.

5. The shortening clutch according to claim 3,
wherein the lock lever includes a guiding slope which is inclined so as to more approach the exposed surface as the guiding slope goes more apart from the pivot point.

6. The shortening clutch according to claim 1,
wherein the main body includes a pair of leg portions facing each other, and the lock lever is disposed in a lever arrangement space present between the pair of leg portions,
wherein the pair of leg portions each include a recess dented from a surface of the leg portion, and
wherein a holding concave portion which, in the locked state, communicates with the recesses present in the pair of the leg portions is provided between the second operating piece and the locking piece.

7. The shortening clutch according to claim 6,
wherein the recesses include sloping surfaces which are inclined relative to the surfaces of the pair of leg portions, and
wherein a slope tilt angle of the sloping surfaces relative to the surfaces is larger than a maximum tilt angle that the lock lever has when inclined most in the unlocked state.

8. A shortening clutch for connecting one chain and another chain, the shortening clutch comprising:
a main body coupled to the one chain and including a pocket for accommodating a first chain link of the another chain;
a lock lever which is pivotably attached to the main body through a pivot point, is capable of switching between a locked state and an unlocked state by pivoting, and in the locked state, restricts disengagement of the first chain link accommodated in the pocket, from the pocket, while in the unlocked state, allowing the first chain link to disengage from the pocket; and
a posture maintaining means which is attached to the main body and maintains a posture that the lock lever has in one of the locked state or the unlocked state,
wherein the lock lever includes:
a locking piece which, in the locked state, projects from the pivot point to the pocket side, in which the locking piece projects toward a position where the locking piece restricts movement of a second chain link of the another chain in an escaping direction, and the second chain link is adjacently coupled, on a side opposite to the escaping direction of the first chain link, to the first chain link accommodated in the pocket;
a first position which is provided in the lock lever and maintains the locked state of the lock lever by being given a force from the posture maintaining means; and
a second position which is provided in the lock lever, maintains the unlocked state of the lock lever by being given the force from the posture maintaining means, and is present at a position different from the first position.

* * * * *